(12) United States Patent
Foger et al.

(10) Patent No.: US 8,057,947 B2
(45) Date of Patent: Nov. 15, 2011

(54) THERMAL MANAGEMENT OF A FUEL CELL SYSTEM

(75) Inventors: Karl Foger, Kew (AU); Scott Neil Barrett, Belmont North (AU); Thang Pham, Glen Waverley (AU); Khaliq Ahmed, Rowville (AU)

(73) Assignee: Ceramic Fuel Cells Limited, Victoria (AU)

( * ) Notice: Subject to any disclaimer, the term of this patent is extended or adjusted under 35 U.S.C. 154(b) by 944 days.

(21) Appl. No.: 10/514,842

(22) PCT Filed: May 20, 2003

(86) PCT No.: PCT/AU03/00609
§ 371 (c)(1),
(2), (4) Date: Mar. 18, 2005

(87) PCT Pub. No.: WO03/098728
PCT Pub. Date: Nov. 27, 2003

(65) Prior Publication Data
US 2005/0181247 A1    Aug. 18, 2005

(30) Foreign Application Priority Data
May 21, 2002   (AU) .................................. PS2448

(51) Int. Cl.
*H01M 8/04* (2006.01)
*H01M 8/06* (2006.01)
(52) U.S. Cl. ......... 429/442; 429/412; 429/423; 429/433
(58) Field of Classification Search .................. 429/408, 429/412, 423, 428, 433, 442, 443, 444
See application file for complete search history.

(56) References Cited

U.S. PATENT DOCUMENTS

| | | | |
|---|---|---|---|
| 3,615,164 A * | 10/1971 | Baker et al. | 423/247 |
| 4,064,156 A | 12/1977 | McRobbie | |
| 5,034,287 A | 7/1991 | Kunz | |
| 5,198,310 A * | 3/1993 | Fleming et al. | 429/17 |
| 5,993,984 A | 11/1999 | Matsumura et al. | |

(Continued)

FOREIGN PATENT DOCUMENTS

| | | | |
|---|---|---|---|
| JP | 63078455 A * | 4/1988 | |
| JP | 07230819 A * | 8/1995 | |
| WO | WO-00/78443 A1 | 12/2000 | |

OTHER PUBLICATIONS

Singh, R. "Will Developing Countries Spur Fuel Cell Surge?", Chemical Engineering Progress, New York: Mar. 1999, vol. 95, Iss. 3, pp. 58-66.*
English Translation of Kumeta et al., JP 63-078455 A.*

*Primary Examiner* — Barbara Gilliam
*Assistant Examiner* — Edu E Enin-Okut
(74) *Attorney, Agent, or Firm* — Birch, Stewart, Kolasch & Birch, LLP.

(57) ABSTRACT

A method for the thermal management of a fuel cell, which method comprises: processing a fuel supply stream comprising hydrogen, steam, at least one carbon oxide and optionally methane using a methanator to produce a fuel cell supply stream comprising a controlled concentration of methane; and reforming within the fuel cell methane present in the fuel cell supply stream, wherein the way in which the methanator is operated is adjusted in response to fluctuations in the temperature of the fuel cell such that the concentration of methane in the fuel cell supply stream is controlled in order to achieve a desired level of reforming of methane within the fuel cell.

11 Claims, 2 Drawing Sheets

U.S. PATENT DOCUMENTS

Figure 1:
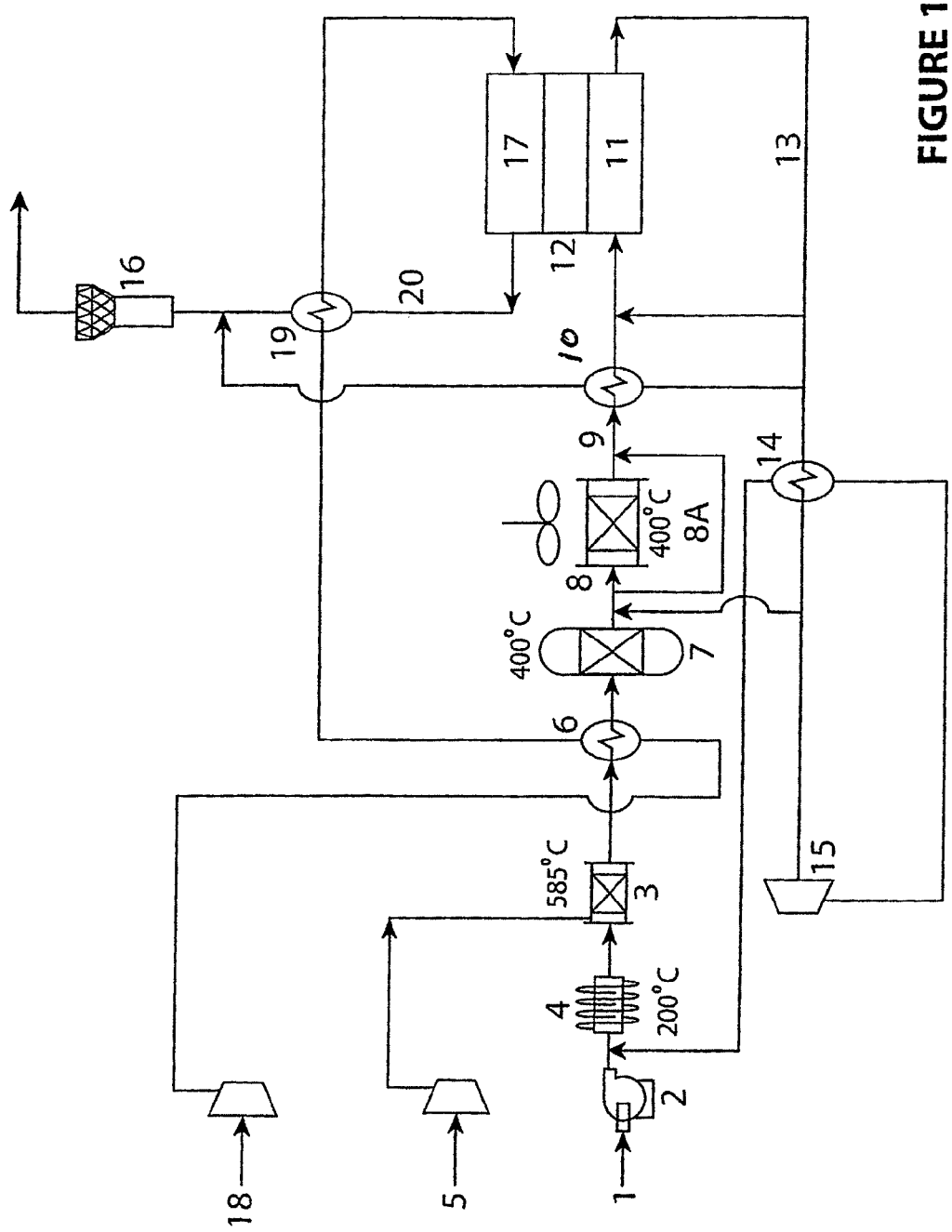

| | | | |
|---|---|---|---|
| 6,223,843 B1 * | 5/2001 | O'Connell et al. | 180/65.3 |
| 6,387,554 B1 * | 5/2002 | Verykios | 429/17 |
| 6,516,905 B1 * | 2/2003 | Baumert et al. | 180/53.8 |
| 2002/0031695 A1 * | 3/2002 | Smotkin | 429/30 |

* cited by examiner

THERMAL MANAGEMENT OF A FUEL CELL SYSTEM

FIELD OF INVENTION

The present invention relates to a method for the thermal management of a fuel cell and to a fuel cell system which facilitates thermal management of a fuel cell. The invention also relates to an auxiliary power unit (APU) incorporating the fuel cell system of the invention.

BACKGROUND OF THE INVENTION

Fuel cells convert gaseous fuels (fuel and oxidant) via an electrochemical process directly into electricity. Generally, the electricity-generating reaction within the fuel cell is exothermic resulting in a temperature increase of the cell. Even though the fuel cell is run at elevated temperature, this temperature increase can reduce fuel cell efficiency and cause thermal runaway, and means for cooling the fuel cell are invariably required.

One method of cooling a fuel cell involves the use of a coolant which is circulated in thermal exchange with the cell. Heat absorbed by the coolant is discharged away from the fuel cell by sensible heat and may be rejected from the system by use of heat exchangers. The coolant may then be recycled to the cell. As an embodiment of this general approach a fuel cell may be cooled by supplying the fuel cell with more oxidant (e.g. air) than is actually required for power generation, the excess oxidant serving as a coolant. However, this approach requires specific cooling circuitry within the fuel cell system and/or an increase in size of passages within the fuel cell to facilitate adequate coolant flow. This also typically requires the use of large fans/compressors and this can result in increased parasitic power losses. These factors result in an increase in the size and complexity of fuel cell systems and an increase in overall expense, particularly where large and/or numerous heat exchangers are called for. Additionally, where the gaseous feed to the fuel cell is used as coolant, the excess flow rate required can lead to increased pressure losses within the system.

SUMMARY OF THE INVENTION

It would be desirable to control the temperature of a fuel cell in a way which does not rely solely on coolant circulation in thermal exchange with the fuel cell. It would be particularly desirable to provide a means for the thermal management of a fuel cell which relies on reactions occurring within the cell itself. This would enable simplified and compact system design, improve efficiency and reduce costs compared with conventional cooling techniques as described.

DETAILED DESCRIPTION

Accordingly, the present invention provides a method for the thermal management of a fuel cell, which method comprises:

processing a fuel supply stream comprising hydrogen, steam, at least one carbon oxide and optionally methane using a methanator to produce a fuel cell supply stream comprising a controlled concentration of methane; and reforming within the fuel cell methane present in the fuel cell supply stream, wherein the way in which the methanator is operated is adjusted in response to fluctuations in the temperature of the fuel cell such that the concentration of methane in the fuel cell supply stream is controlled in order to achieve a desired level of reforming of methane within the fuel cell, the methanator being by-passed in order to vary the amount of fuel supply stream which is processed by the methanator in order to achieve a rapid response in methane production depending on fluctuations in fuel cell temperature on transition between differing load demands on the fuel cell.

The generation of electricity in the fuel cell is exothermic, in that heat arises from the irreversible energy losses associated with entropy changes. Methanation is also an exothermic reaction. Reforming of methane within the fuel cell (also referred to herein as internal reforming) is an endothermic reaction. The present invention may achieve thermal management of the fuel cell system by using the exothermic reaction of methanation to reject energy contained in the fuel to a cooling stream and that heat rejection is balanced by the heat absorbed by the endothermic reaction of internal reforming. This is performed mindful of the heat balance also being affected by the unfavourable losses to the environment and energy imbalance of ingoing/outgoing reactants. The system thermal management is thereby managed by control of the composition of reactants and therefore the reactions occurring within the cell itself. An important aspect of the present invention is the active control of the way in which the methanator is operated in order to control the methane concentration in the fuel cell supply stream and thus the amount of methane available for internal reforming within the fuel cell. This control may be achieved by varying temperature and/or pressure at which the methanator is operated, the amount of steam supplied to the methanator (for example supplied from anode recycle or from an external supply) and the extent of methanator by-pass (as discussed below). As the endothermic internal reforming reaction acts as a heat sink for heat produced by the exothermic electricity-generating reaction within the fuel cell, controlling the amount of methane available for internal reforming enables the temperature of the fuel cell to be controlled. In turn this reduces the need to employ the kind of fuel cell cooling systems described above, although in practice smaller scale systems are likely to be employed in conjunction with the method of thermal management in accordance with the present invention. Even though an external heat exchange system may still be required, this can be downsized significantly resulting in significant cost and space savings.

The methane concentration in the fuel cell supply stream may be controlled by adjusting the temperature at which the methanator is operated. In practice, a methanator has a particular operating temperature range and this will depend, amongst other things, on the type of catalyst employed. In accordance with the present invention the methanator will be operated at a suitable temperature within this operating range to achieve the desired control of methane output. Where high methane concentration is required, the methanator is operated at the low end of the methanator operating temperature range, as this favours methane formation. Thus, under conditions of high load it is necessary to reject a lot of heat from the input stream to the methanator and/or from the methanator itself. Conversely, where low methane concentration is required, the methanator is run at the high end of the methanator operating temperature range.

Usually the temperature of the methanator is managed by cooling rather than heating. This is because the fuel supply stream input to the methanator is invariably processed upstream of the methanator in order to generate the reactants necessary for the methanation reaction, and this processing generally takes place at temperatures higher than the temperature at which the methanator would be operated. Indeed, thermodynamically to achieve methanation, the temperature at which the methanator is operated must be lower than that of the upstream processing. Thus, prior to delivery to the methanator, the fuel supply stream is usually cooled and the extent of cooling enables the temperature at which methanation takes place to be controlled. When the methanator is required to be run at high temperature (low level methanation), less cooling is obviously required than when the methanator is run at low temperature (high level methanation). The fuel supply stream may be cooled by conventional techniques such as by use of heat exchangers. The methanator itself may be cooled by conventional means, for example by air blowers, pipe coils, heat exchange plates and cooling channels provided within the methanator.

To enhance the output range of the fuel cell system it may be appropriate to insulate the methanator to avoid unwanted or unexpected heat loss (though such loss may be taken into account if the methanator is not well insulated). Unwanted or unexpected loss from the methanator may have a detrimental effect on operation of the fuel cell, particularly under turn-down where the load demand on the fuel cell is low and minimal internal reforming of methane is required in order to achieve thermal balance. In that case the methanator is operated at a (high) temperature which is the same or approximately the same as the temperature at which upstream processing of the fuel supply stream takes place. Operation under such conditions results in minimal or no methane production, as desired. However, a reduction in methanator temperature, for example due to heat loss, will result in higher than expected methane concentration in the fuel cell supply stream and thus an increased level of endothermic internal reforming of methane within the fuel cell. The result of this may be chilling of the cell if the heat absorbed by the endothermic methane reforming reaction exceeds that generated by the exotherms of electricity-generation occurring within the fuel cell.

However, it will be appreciated that insulating the methanator will make it difficult to achieve rapid cooling, for example when it is desired to reduce the methanator temperature under high load conditions in order to achieve an increase in production of methane. To increase the dynamic response of the system it is preferable to avoid insulation and to split the methanator supply stream between the methanator and a bypass. The extent of bypass may be used to control operation of the methanator in response to the changing load demand on the system. For instance, when the fuel cell supply stream is required to have a low methane concentration, this may be achieved by by-passing the methanator. The extent of by-pass allows rapid and convenient control of the methane concentration in the fuel cell supply stream.

Another alternative, or as an addition, the methane concentration in the fuel cell supply stream may be controlled by adjusting the amount of water (steam) in the methanator input stream. In the methanator the following reactions occur:

$$CO+3H_2 \leftrightharpoons CH_4+H_2O \quad (1)$$

$$CO_2+4H_2 \leftrightharpoons CH_4+2H_2O \quad (2)$$

$$CO+H_2O \leftrightharpoons CO_2+H_2 \quad (3)$$

It will be appreciated that low water concentration in the input to the methanator favours formation of methane, whereas high water concentration does not. Varying the water concentration in the input stream to the methanator will also have an impact on the hydrogen concentration due to dilution effects. With low water concentration the extent of dilution is low and the hydrogen concentration relatively high. This too favours methane production. When the water concentration in the methanator input stream is high, the hydrogen concentration is reduced by dilution, and this favours reduced methane formation. This said, bypass ratio regulation of the methanator is the preferred means of controlling methane production in combination with the chosen temperature for methanator operation.

The amount of steam delivered to the methanator may be controlled by manipulation of upstream processes, as will be discussed below, and/or by varying the proportion of anode waste stream that is recycled to the methanator. Desirably, the method of the present invention does not require any separate water input and operates using the minimum amount of water. This avoids the need for water storage vessels, condensation units and the like. However, if required, a reservoir or an external water supply may be provided for specific needs, for example, at start up.

A significant advantage of the present invention is that the methane concentration in the input stream to the stack may be varied on a continuous and rapid basis thereby allowing the extent of internal reforming of methane within the fuel cell to be controlled in response to fluctuations in fuel cell temperature, such as would occur when the load demand on the fuel cell varies. For instance, as the load demand on the fuel cell increases, so does its requirement for heat rejection due to an increase in the exotherm of electricity-generation. In this case the methanator may be operated so that the resultant fuel cell supply stream has a sufficiently high methane concentration so that internal reforming in the cell takes place to a greater extent, thereby consuming additional heat produced by the exothermic electricity-generating reaction. Conversely, when the fuel cell is under lower load conditions, the amount of heat produced from the inefficiencies of electricity generation in the fuel cell is less than under higher load conditions. In this case the methane concentration in the fuel cell supply stream may be reduced as less internal reforming of methane is required to consume heat produced by electricity generation in the fuel cell. The use of a methanator, the methane output of which may be continuously adjusted, therefore allows thermal management of the fuel cell.

Desirably the present invention provides dynamic response to fluctuations in temperature of the fuel cell in order to achieve on-going thermal balance during transition between operating modes. Under high load, the methanator is operated at low temperature in order to achieve high methane concentration in the input stream to the fuel cell. On transition to low load, the methane requirement necessary for thermal balance is reduced significantly. This may be achieved by allowing the temperature of the methanator to rise. However, this does not occur rapidly with the result that the transition between these operating states tends to have a lag. This may be remedied by causing some or all of the fuel supply stream to by-pass the methanator altogether. This by-pass can be used to minimise or avoid methane production without having to resort to raising the temperature of the methanator to achieve the same effect. This allows a more dynamic response to the transition between high and low load operating states. Conversely, when there is a transition from low load to high load operation, the proportion of fuel supply which is allowed to by-pass the methanator may be restricted so that increased methanation takes place, as necessary to achieve thermal balance of the fuel cell under increased load demand. Using a methanator by-pass allows the methanator temperature to be suitably managed in order to achieve rapid response in methane production depending on fluctuations in fuel cell temperature on transition between differing load demands. The present invention includes this methanator by-pass as part of the overall system design.

In order for the methanator to be able to produce methane the fuel supply stream delivered to it must include suitable reactants, i.e. hydrogen and carbon oxides. In this regard, the present invention may utilise a variety of fuels as fuel input provided that the chosen fuel may be processed (upstream of the methanator) in order to generate these reactants. The present invention embraces this processing of the fuel, and provides also a fuel cell system incorporating means for effecting the processing and subsequent methanation with active control of methane output concentration delivered to the fuel cell. The fuel may be a hydrocarbon fuel such as petrol, diesel, LPG, LNG, an alcohol or natural gas. Alternatively, the fuel may be a so-called "biofuel" which is essentially free of sulfur-containing compounds. These include bioethanol, biodiesel, rapeseed oil, rapeseed methyl ester, canola oil, canola methyl ester, corn oil, hemp oil, switch grass oil, fatty acid methyl esters, linseed oil, linseed methyl ester, sunflower oil, sunflower oil methyl ester, soy bean oil, palmitic acid, lauric acid, stearic acid and lanoleic acid.

The processor used to process the fuel in order to generate the reactants needed to facilitate methanation will obviously be selected based on the chosen fuel. The nature of the fuel will depend upon the context in which the present invention is applied. For instance, and as is discussed in greater detail below, when the present invention is applied to an auxiliary power unit (APU) for use in automotive applications, the fuel is likely to be diesel, petrol, LNG, LPG or an alcohol.

In accordance with an embodiment of the present invention, fuel is converted to a fuel cell supply stream having the desired concentration of methane in successive stages. The first stage involves means for converting the fuel into a processed fuel stream comprising hydrogen, steam and at least one carbon oxide. As noted above, the input stream to the methanator must include these reactants in order to be able to produce methane. The fuel may optionally already contain a concentration of methane. Any suitable fuel processor may be used depending upon the chosen fuel. In practice conversion of the fuel may be achieved using an autothermal reformer (ATR) or a catalytic partial oxidation (CPOX) or partial oxidation (POX) reactor. Autothermal reforming combines catalytic partial oxidation (or partial oxidation) and steam reforming reactions, the oxidation reaction providing heat for the endothermic (steam) reforming reaction.

Autothermal reforming or catalytic partial oxidation takes place over a suitable catalyst. Typically, the catalyst comprises platinum, palladium, ruthenium or rhodium, supported on a refractory metal oxide such as alumina, in a suitable form such as a monolithic body. Alternatively, the partial oxidation catalyst or autothermal reformer catalyst may be an oxide-based catalyst which is more tolerant to sulfur containing fuels. Desirably, the catalyst used to effect catalytic partial oxidation is effective in the presence of sulfur compounds, although sulphur removal is required to prevent poisoning of the methanator catalyst and/or the anode. The temperature at which catalytic partial oxidation takes place is typically 400 to 1000° C., for example 800 to 900° C.

Partial oxidation is purely a thermal process, without catalysis. When diesel is used as the fuel the POX reactor may be fitted with a heated (platinum) element to assist cold start-up until sufficient heat has been generated to raise the temperature of the reactor to above the light-off temperature of diesel.

In an autothermal reformer the catalytic partial oxidation or partial oxidation usually takes place in a first catalytic zone. The steam reforming catalyst of the autothermal reformer is typically provided in a second catalyst zone. The catalyst used for the steam reforming reaction may comprise any of the catalytic metals known to be useful for steam reforming, such as nickel, cobalt, platinum and ruthenium and mixtures thereof. The catalyst may be used in the form of a particulate bed or supported on an inert carrier support, as mentioned above for the partial oxidation catalyst. If appropriate, the autothermal reformer may be fitted with a heated (platinum) element, as described above.

If the methane content of the fuel stream out of the upstream processor (i.e. the ATR, CPOX, or POX) is too high for low load conditions, the methanator may be run as a second-stage reformer. To provide the desired steam quantity for this reaction, the anode recycle stream may have an additional split going to the methanator, which is operated only under such a situation.

On start up of the system there is no steam available for reforming in the autothermal reformer. Initially therefore the autothermal reformer is run dry as a partial oxidation reactor. Some steam may be introduced externally, though this is not essential. In a preferred embodiment, when an autothermal reformer is used in the first stage, steam required for the operation thereof is applied by recycling a portion of the anode exhaust stream to the autothermal reformer. This avoids the need to have a separate water input for the system. In another preferred embodiment, the anode exhaust stream is also recycled and fed to the anode input. This portion of the anode exhaust stream is delivered in the fuel cell supply stream downstream of the methanator. By splitting the recycle loop in this way it is possible to adjust independently the steam to carbon (S/C) ratio in both components (a higher S/C ratio is required in the fuel cell). This may be achieved by use of control valve(s), the placement of a blower, ejector or passive flow splitter device. Adding steam to the fuel cell supply for the anode of the fuel cell downstream of the methanator allows the S/C ratio for the fuel cell to be adjusted without introducing steam to the methanator. Minimising the steam input to the methanator increases the hydrogen concentration in the methanator feed because of reduced dilution. Both of these are beneficial in terms of achieving high levels of methanation. In turn, this enables more scope for thermal management of fuel cell temperature under high load. It is also desirable to reduce the water concentration in the feed to the desulfuriser unit as improved sulphur removal in the adsorbent bed may then be achieved. The size of the adsorbent bed may also be reduced as a consequence. Reduced volumetric flow in the methanator enables a smaller (and cheaper) methanator to be used.

The POX reactor is run dry and does not require steam for its operation. In this case a portion of the anode exhaust stream may be recycled and delivered to the methanator in order to influence the extent of methanation, as discussed above. Anode recycle upstream of the methanator also assists in avoiding carbon formation in the methanator. In this embodiment it is also preferable to split the anode waste stream recycle and feed a portion thereof to the anode of the fuel cell. This portion is introduced into the fuel cell supply stream downstream of the methanator. The S/C ratio of the input to the fuel cell can be controlled in this way.

The following equations summarise the catalytic partial oxidation and steam reforming of higher hydrocarbons ($C_xH_y$) (reactions 1-3):

| | |
|---|---|
| $C_xH_y + (x + y/4)O_2 \rightarrow xCO_2 + y/2\ H_2O$ | (1) Combustion |
| $C_xH_y + x/2\ O_2 \rightarrow xCO + y/2\ H_2$ | (2) Partial oxidation |
| $C_xH_y + xH_2O \rightarrow xCO + (x + y/2)H_2$ | (3) Steam reforming |
| $CO + H_2O \rightarrow H_2 + CO_2$ | (4) Water-gas shift reaction |

In an embodiment of the invention the catalysts for the partial oxidation and steam reforming reactions are present in a single reaction zone within the vessel used for autothermal reforming.

Depending upon the fuel used and the catalyst used in the methanator, it may be appropriate to process the fuel to remove sulfur-containing compounds. If a low-sulfur fuel (<5 ppm) or biofuel is used as fuel, following processing upstream of the methanator, the sulfur concentration is likely to be about 1 ppm or less. In this case, no sulfur-removal means are necessary to avoid possible catalyst poisoning in upstream reformer and/or the methanator and/or anode of the fuel cell.

If the fuel is a hydrocarbon fuel including organic-sulfur containing compounds such as thiophenes and mercaptans, and other carbon-containing sulphur compounds such as carbonyl sulphide and carbon disulphide, these will be converted to sulphur dioxide and hydrogen sulfide in the upstream processor. In such a case and in the case where the fuel contains hydrogen sulphide alone, desulfurisation will be necessary to remove hydrogen sulfide which would otherwise cause poisoning of the catalyst in the methanator and/or the anode of the fuel cell. Typically, the processed fuel from the upstream reformer is cooled to about 400° C. prior to delivery to the adsorbent bed. The desulfurisation unit is operated under conventional operating conditions. Alternatively, such a fuel may be passed through a fuel sulfur trap upstream of the ATR or CPOX. This will be particularly preferable if the ATR or CPOX catalyst is not tolerant to sulphur levels present in the fuel.

Prior to delivery of the fuel cell supply stream to the fuel cell the sulfur content of the stream is typically reduced to a level of less than about 1 part per million by weight, and preferably to less than 0.2 parts per million by weight.

Subsequent to any sulfur removal necessary, a fuel stream may be delivered to the methanator, although by-passing of the methanator is possible as mentioned above.

Prior to delivery to the fuel cell the fuel cell supply stream is heated. This may be achieved using a heater and by thermal exchange with the anode waste stream when the fuel cell is running.

In the system of the invention described it will be appreciated that the autothermal reformer, CPOX or POX reactor is provided in communication with any sulfur removal unit, the position of the latter being dependent on the type of fuel used. In turn, the methanator of the system is provided upstream of and in communication with a fuel cell, the methanator output (the fuel cell supply stream) being delivered to the anode of the fuel cell.

The various components of the fuel cell system are in communication with each other by means of conventional gas supply conduits. These may include ancillary components such as heat exchangers, control valves, manifolds, pumps and condensers, as necessary. The terms "upstream" and "downstream" are intended to reflect the positions of the various components of the system relative to each other. The accompanying figures also illustrate this.

The methane concentration of the fuel cell supply stream will be varied in order to achieve thermal management of the fuel cell. Generally, to achieve adequate cooling under conditions of maximum cell load, the methane content of the fuel cell supply stream will be up to about 30% volume, measured on a wet basis. The methane concentration suitable will depend upon such things as load demand, anode recycle and/or heat loss from the fuel cell. For example, under conditions of high load, low anode recycle and low heat loss, the methane concentration will be at or toward the upper limit of this range. Under conditions of low load, high anode recycle and proportionally high heat loss from the system per unit of fuel input to the system, the methane concentrations will be at the low end of this range. Very high levels of methane in the fuel cell supply stream have the potential to cause excessive cooling as a result of the endothermic in stack reforming reaction.

Methane present in the fuel cell supply stream is reformed at the anode of the fuel cell. The anode may comprise a metallic component such as nickel, cobalt, iron or other transition metals, supported on a suitable material such as zirconia, ceria, samaria, or other rare-earth oxides, to catalyse the methane reforming reaction and the fuel-cell reaction. The anode may contain additional materials like magnesium oxide or other alkaline oxides as promoters. The reforming anode catalyst may be provided in fuel flow channels within the anode side of the fuel cell.

In the present invention the methane concentration in the fuel cell supply stream is adjusted based on the temperature of the fuel cell, the temperature varying with load demand. Control may involve measurement of the fuel cell temperature with appropriate adjustment of how the methanator is operated with consequential impact on the extent of endothermic reforming within the cell and thermal management thereof. Control may even involve the temperature control of the upstream processor in order to minimise the cooling requirement in the methanator, e.g. at high load the upstream processor should be running at the lower temperature range to produce a gas with a high concentration of methane. Thus, the methanation reaction and cooling will be reduced. At low load, where thermal substainability of the stack is more difficult, the methane concentration should be at the lower end (hydrogen concentration at the higher end) and this may be achieved with bypassing or temperature increase of the methanator. In this way the temperature of the fuel cell may be optimised for a given load demand. Typically, the base line running temperature of the fuel cell will be about 650-850° C.

It is also possible to achieve fuel cell cooling using the kind of conventional coolant-based techniques described above, and this may be particularly appropriate if the temperature of the fuel cell spikes suddenly. This may be influenced by the size of the fuel cell due to thermal inertia. However, reliance on such techniques will be diminished by practice of the invention in which the reactions within the fuel cell are advantageously self-sustaining, primarily at high load. This means that ancillary cooling systems, if needed, may be simplified and reduced in size. The present invention aims to provide a rapidly responsive means of thermally managing a fuel cell which also enables suitably rapid load following.

The fuel cell and its associated assembly can take any suitable form, a solid oxide fuel cell (SOFC) or molten carbonate fuel cell (MCFC). Preferably the fuel cell operates at a temperature which is sufficient to provide essentially substantial conversion of the methane in the internal reforming reaction. This maximises the efficiency of the thermal management system. Preferably, the reforming catalyst provided in the fuel cell has capacity to reform the maximum methane concentration likely to be provided to the fuel cell during operation thereof. This also contributes to the efficiency of the fuel cell system of the present invention.

The fuel cell supply stream is delivered to the anode of the fuel cell by conventional means. Pre-heated oxidant, typically air, is fed to the cathode of the fuel cell. Exhaust gases of the fuel cell may be processed using a catalytic oxidiser. Advantageously, steam may be provided to the autothermal reformer and/or the fuel cell (for internal reforming) by recycling of the anode exhaust stream. The anode exhaust stream may be returned to and mixed with the fuel supply stream for the autothermal reformer using a hot gas blower. The anode exhaust stream may also be recycled to a CPOX or POX reactor when used, although these require less steam to function than an autothermal reformer.

The fuel cell system described is capable of transforming a fuel, such as diesel, to a fuel suitable for use in a fuel cell operating at maximum internal reforming. Thermal management of the fuel cell (or stack of fuel cells as will be the case in practice), in accordance with the present invention maximises efficiency as a direct result of reducing the requirement to use air flow to achieve cooling. Advantageously, the system may also have water self-sufficiency in that no additional water needs to be introduced from a separate supply. This also allows ancillary components such as condensation units to be omitted from the system. When appropriate, it is also possible to use a relatively small adsorbent bed for removal of $H_2S$ as anode waste stream is typically recycled after the exit of the bed. The efficiency of the bed is enhanced by minimising water input to it. These factors enhance the overall efficiency and contribute to providing a compact system. This being the case, the fuel cell system of the present invention is particularly well suited for use as an APU, especially in automotive applications. In such applications the APU may be used to power such things as vehicle lighting and heating/cooling systems. The latter would otherwise derive electrical power indirectly by operation of the power plant providing motive power. This is inefficient use of fuel, especially when the vehicle is idling. The present invention therefore also provides an APU which utilises the method for thermal management described herein. The invention also provides an APU comprising the fuel cell system described herein, preferably for use in an automotive application. Typically, the APU will run on the same fuel as the power plant providing the motive power, usually diesel, petrol, LNG, LPG or alcohol.

Generally, the fuel supply stream is supplied to multiple fuel cells, commonly called a fuel cell stack in the case of planar SOFCs. However, the invention also extends to the process being performed using a single fuel cell or other types of fuel cells, such as MCFC for example. By way of example only, several different planar SOFC components and systems, SOFCs and materials are described in our International Patent Applications PCT/AU96/00140, PCT/AU96/00594, PCT/AU98/00437, PCT/AU98/00719 and PCT/AU98/00956, the contents of which are incorporated herein by reference, including the corresponding U.S. Pat. No. 5,942,349 and patent application Ser. Nos. 09/155,061, 09/445,735, 09/486, 501 and 09/554,709, respectively. Other disclosures appear in our International patent applications PCT/AU99/01140, PCT/AU00/00630 and PCT/AU00/631.

Figure 2:
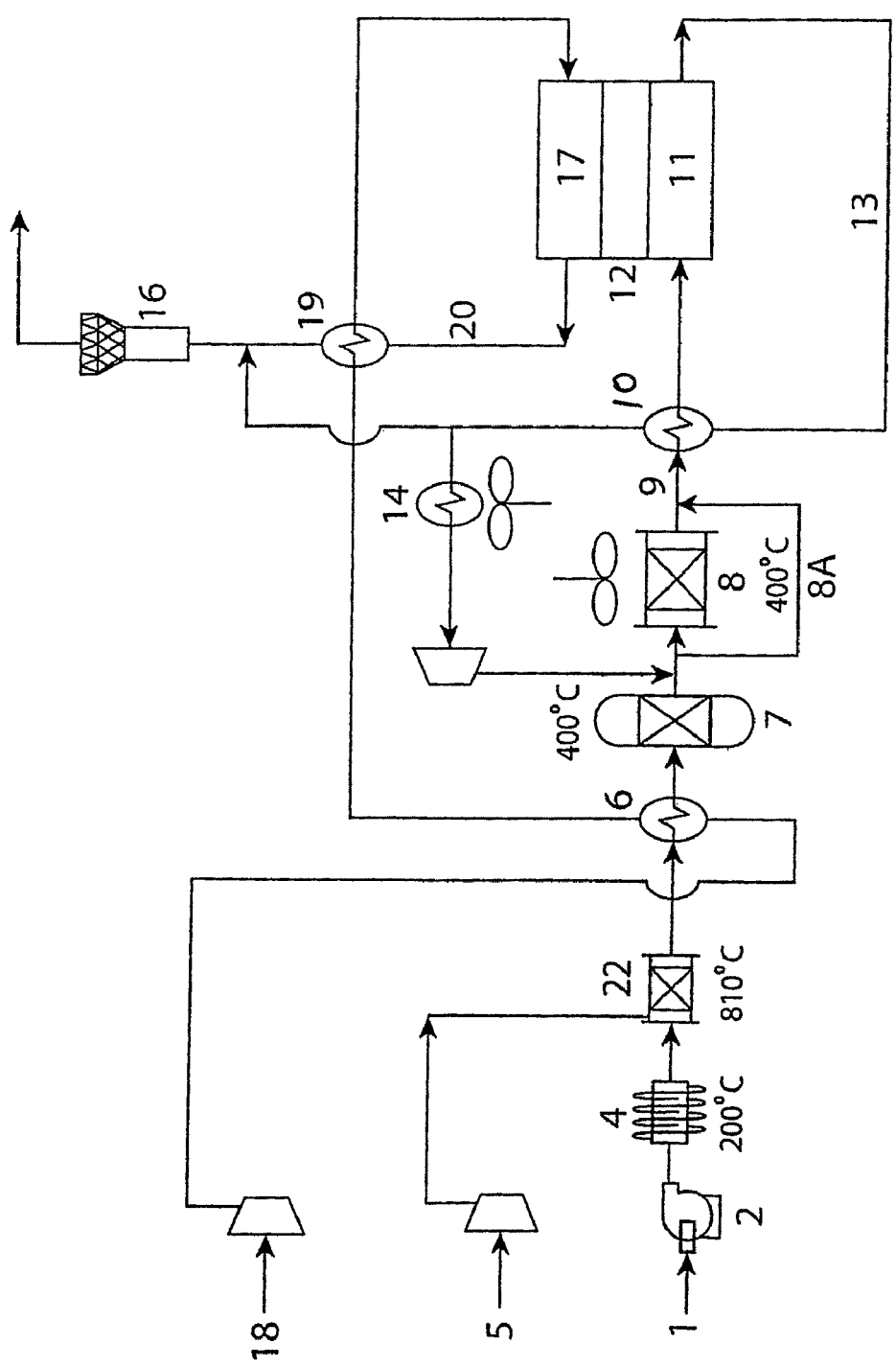

The present invention will now be illustrated by reference to the accompanying non-limiting figures in which FIGS. 1 and 2 are schematics showing fuel cell systems in accordance with the invention.

More particularly, FIG. 1 shows a fuel cell system in which a fuel stream (1) comprising volatile higher $C_{2+}$ hydrocarbons (and organic sulfur-containing compounds) is delivered via a pump (2) to an autothermal reformer (3). Prior to delivery to the autothermal reformer (3), the fuel is vaporised using an electrically heated vaporiser (4) operating at an appropriate temperature of about 200° C. Air (5) is also delivered to the autothermal reformer. The autothermal reformer (3) operates at a temperature of around 600° C. depending upon the chosen catalyst and its activity, and produces a processed fuel stream comprising hydrogen and a carbon oxide or oxides. The processed fuel stream is then delivered via a heat exchanger (6) to a desulfuriser unit (7) comprising a ZnO adsorbent bed. In the embodiment illustrated the desulfuriser unit (7) is operated at about 400° C. In the desulfuriser unit (7) $H_2S$ is adsorbed.

The resultant desulfurised fuel stream is then delivered to a methanator (8) operated at a temperature of about 400° C. In this case cooling of fuel stream to the methanator (8) is not required. If the methanator (8) is operated at a temperature lower than that of the fuel output of the desulfuriser unit (7) cooling will be required. As the reactions in the methanator are exothermic it may be necessary to cool the methanator even if the required methanator temperature is above that of the desulfuriser unit. In the methanator (8) hydrogen and a carbon oxide or oxides are reacted over a suitable catalyst to produce methane. The system includes a methanator by-pass (8A) which allows the desulfurised fuel stream to be diverted around the methanator. This is useful under certain operating conditions, as described above. The resultant fuel cell supply stream (9) is heated using a heater (10) to raise the fuel temperature prior to delivery to the anode (11) of a fuel cell stack (12). At the anode (11) methane is reformed and this reaction consumes heat generated by the endothermic reforming reaction. A portion of the anode waste stream (13) is recycled with cooling using a heat exchanger (14) before delivery by a recycle blower (15) to the autothermal reformer (3). The anode waste stream (13) contains steam and varying the extent of recycling provides a means for varying the methane output from the methanator (8). A portion of the anode waste stream (13) may be used to pre-heat the fuel cell supply stream (1) by means of a heat exchanger (10). That portion may then be delivered to a catalytic oxidiser (16). A portion of the anode waste stream may also be mixed with the desulfurised fuel stream supplied to the methanator and/or with the fuel cell supply stream prior to delivery of the latter to the anode (11). The cathode (17) of the fuel cell stack (12) is supplied with oxidant (air) (18) which is preheated using heat exchangers (6, 19). The cathode waste stream (20) is fed to the catalytic oxidiser (16) in heat exchange with the incoming oxidant supply at heat exchanger (19).

The temperature of the fuel cell stack (12) is monitored using a thermocouple or other means (not shown) and the methanator output controlled in order to provide an appropriate amount of methane to the anode (11) such that internal reforming takes place to the extent necessary to achieve thermal balance of the fuel cell.

If the fuel is diesel the vaporiser (4) may be incapable of vaporising diesel. In this case the vaporiser (4) could be omitted and a portion of the anode exhaust stream used to vaporise the diesel fuel. In this case the recycle blower (15) may be used to circulate anode exhaust stream in a loop in thermal exchange with a heat exchanger provided upstream of the heat exchanger (14). Diesel will then be injected into the pre-heated anode exhaust thus preventing or minimising, coking of the diesel. Alternatively or additionally the reactor used to process the fuel may include an electrically heated catalyst. Diesel may be sprayed into the reactor and mixed with the hot anode recycle and air and ignite over the electrically heated catalyst.

In FIG. 2 the system layout is essentially the same as in FIG. 1 although the autothermal reformer in FIG. 1 is replaced by a partial oxidation reactor (22). In this case it is not necessary to recycle steam to the reactor (22) and thus the recycle loop involving the anode waste stream (13) is slightly different. In FIG. 2 a portion of the anode waste stream (13) may be recycled to the methanator (8) via a heat exchanger (14). One consequence of this is that steam is not supplied to the ZnO bed of the desulfuriser unit (7) and this allows the size of the bed to be reduced.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The claims defining the invention are as follows:

1. A method for thermal management of a fuel cell system comprising a single fuel cell, which method comprises:
    (a) processing a fuel using an autothermal reformer, a catalytic partial oxidation reactor or partial oxidation reactor to produce a fuel supply stream comprising hydrogen, steam, at least one carbon oxide and optionally methane;
    (b) processing the fuel supply stream produced in (a) using a methanator to produce a fuel cell supply stream comprising a controlled concentration of methane; and
    (c) reforming within the fuel cell methane present in the fuel cell supply stream,
    wherein operation of the methanator is adjusted in response to fluctuations in the temperature of the fuel cell such that the concentration of methane in the fuel cell supply stream is controlled in order to achieve a desired level of reforming of methane within the fuel cell, and wherein the methanator only is by-passed in order to vary the amount of fuel supply stream which is processed by the methanator so that a rapid response in methane production depending on fluctuations in fuel cell temperature on transition between differing load demands on the fuel cell is achieved; and
    wherein the fuel cell has a base running temperature of about 650-850° C.

2. A method according to claim 1, wherein the methane concentration in the fuel cell supply stream is controlled by varying the temperature and/or pressure at which the methanator is operated.

3. A method according to claim 1, wherein the methane concentration in the fuel cell supply stream is controlled by varying the amount of steam supplied to the methanator.

4. A method according to claim 1, wherein the fuel is petrol, diesel, LPG, LNG, an alcohol or natural gas.

5. A method according to claim 1, wherein the fuel is bioethanol, biodiesel, rapeseed oil, rapeseed methyl ester, canola oil, canola methyl ester, corn oil, hemp oil, switch grass oil, fatty acid methyl esters, linseed oil, linseed methyl ester, sunflower oil, sunflower oil methyl ester, soy bean oil, palmitic acid, lauric acid, stearic acid or lanoleic acid.

6. A method according to claim 1, wherein the fuel cell is a solid oxide fuel cell or a molten carbonate fuel cell.

7. A method according to claim 1, wherein the fuel cell forms part of an auxiliary power unit.

8. A method according to claim 7, wherein the auxiliary power unit is used in an automotive application.

9. A fuel cell system comprising:
    an autothermal reformer, catalytic partial oxidation reactor or partial oxidation reactor for processing a fuel to produce a fuel supply stream comprising hydrogen, steam, at least one carbon oxide and optionally methane;
    a methanator suitable for processing the fuel supply stream to produce a fuel cell supply stream comprising a controlled concentration of methane; and
    a single fuel cell which is provided downstream of and in communication with the methanator and which is suitable for reforming methane present in the fuel cell supply stream delivered to an anode of the fuel cell from the methanator,
    wherein the system comprises means for adjusting the way in which the methanator is operated in response to fluctuations in the temperature of the fuel cell such that the concentration of methane in the fuel cell supply stream is controlled in order to achieve a desired level of reforming of methane within the fuel cell, said means comprising a methanator only by-pass to vary the amount of fuel supply stream supplied to the methanator; and
    wherein the fuel cell has a base running temperature of about 650-850° C.

10. A fuel cell system according to claim 9, wherein the fuel cell system forms part of an auxiliary power unit.

11. A fuel cell system according to claim 10, wherein the auxiliary power unit is used in an automotive application.

* * * * *